United States Patent
Sato et al.

(10) Patent No.: US 6,898,956 B2
(45) Date of Patent: May 31, 2005

(54) METAL RING INPUTTING AND OUTPUTTING DEVICE

(75) Inventors: Hideshi Sato, Sayama (JP); Yuji Narusaki, Sayama (JP); Kiyonori Okano, Sayama (JP); Minoru Tomizawa, Sayama (JP); Masao Nitta, Sayama (JP); Yoshiharu Watabe, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 171 days.

(21) Appl. No.: 10/399,538

(22) PCT Filed: Sep. 18, 2001

(86) PCT No.: PCT/JP01/08106

§ 371 (c)(1),
(2), (4) Date: Apr. 18, 2003

(87) PCT Pub. No.: WO02/34479

PCT Pub. Date: May 2, 2002

(65) Prior Publication Data

US 2004/0020257 A1 Feb. 5, 2004

(30) Foreign Application Priority Data

| Oct. 20, 2000 | (JP) | ........................ 2000-320521 |
| Oct. 20, 2000 | (JP) | ........................ 2000-321138 |
| Oct. 20, 2000 | (JP) | ........................ 2000-321139 |
| Nov. 22, 2000 | (JP) | ........................ 2000-356188 |
| Dec. 18, 2000 | (JP) | ........................ 2000-384181 |

(51) Int. Cl.$^7$ .......................................... B21D 15/00
(52) U.S. Cl. ............................ 72/111; 72/110; 72/420; 72/422; 414/225.01
(58) Field of Search ....................... 72/107, 110, 111, 72/205, 378, 419, 420, 421, 422, 423; 198/750.11, 803.3; 414/225.01, 226.02

(56) References Cited

U.S. PATENT DOCUMENTS

| 4,757,701 | A | | 7/1988 | Hamada |
| 5,640,868 | A | * | 6/1997 | Lauener ........................ 72/110 |
| 6,318,140 | B1 | * | 11/2001 | Yamagishi et al. ............ 72/110 |
| 2004/0035170 | A1 | * | 2/2004 | Sato et al. ..................... 72/111 |
| 2004/0065128 | A1 | * | 4/2004 | Narusaki et al. ............... 72/111 |

FOREIGN PATENT DOCUMENTS

| EP | 0 922 884 A2 | | 6/1999 | |
| JP | 62-279006 | * | 12/1987 | ............. B21B/5/00 |
| JP | 2-51682 B2 | | 11/1990 | |
| JP | 4-9062 Y2 | | 3/1992 | |
| JP | 5-80295 B2 | | 11/1993 | |
| JP | 11-290908 | * | 10/1999 | ............. B21B/5/00 |

* cited by examiner

Primary Examiner—Ed Tolan
(74) Attorney, Agent, or Firm—Birch, Stewart, Kolasch & Birch, LLP

(57) ABSTRACT

A metal ring loading and unloading apparatus is capable of loading and unloading a metal ring quickly and highly accurately for increased efficiency. The metal ring loading and unloading apparatus has a moving unit 41 slidably movable along a rail 48 which extends from a loaded ring placement unit 8 to an unloaded ring placement unit 11. On the moving unit 41, there are mounted a loaded ring delivering unit 9 for holding and delivering a metal ring W on the loaded ring placement unit 8 and an unloaded ring delivering unit 10 for removing the metal ring W from support rollers 3, 4 and delivering the metal ring W to the unloaded ring placement unit 11. The loaded ring placement unit 8 has a pressing unit for radially pressing the metal ring W to deform the metal ring W into a substantially elliptical shape. The loaded ring delivering unit 9 has a loaded ring gripping unit 26 for gripping the metal ring W deformed by the pressing unit. The unloaded ring delivering unit 10 has an unloaded ring gripping unit 53 for gripping the metal ring W under its own recovering resiliency produced when the support rollers 3, 4 move toward each other. The unloaded ring placement unit 11 has a releasing unit for releasing the metal ring W from the unloaded ring gripping unit 53.

18 Claims, 7 Drawing Sheets

METAL RING INPUTTING AND OUTPUTTING DEVICE

This application is the national phase under 35 U.S.C. § 371 of PCT International Application No. PCT/JP01/08106 which has an International filing date of Sep. 18, 2001, which designated the United States of America.

TECHNICAL FIELD

The present invention relates to an apparatus for loading a resilient metal ring to support the resilient metal ring on a support roller and unloading the resilient metal ring supported on the support roller.

BACKGROUND ART

Belts for transmitting power in continuously variable transmissions, for example, use laminated rings of metal to bundle a plurality of elements that are arrayed in an annular endless pattern. Metal rings that make up the laminated rings are produced by slicing, at certain axially spaced intervals, a cylindrical drum into endless strips, loading the endless strips into a rolling mill or a circumferential length correcting machine, and processing the loaded endless strips into metal rings having desired circumferential lengths.

Such a rolling mill or a circumferential length correcting machine has a pair of support rollers for supporting a metal ring in a substantially elliptical shape, and a support roller moving means for moving at least one of the support rollers away from the other support roller to impart a prescribed tension to the metal ring. The rolling mill or the circumferential length correcting machine processes the metal ring that is supported in the substantially elliptical shape.

For loading a metal ring into the rolling mill or the circumferential length correcting machine, it has heretofore been customary for the worker to manually deform the metal ring into a substantially elliptical shape that corresponds to a supporting shape provided by the support rollers, and at the same time to manually support the deformed metal ring onto the support rollers. For unloading the metal ring from the rolling mill or the circumferential length correcting machine, it has also been customary for the worker to manually remove the metal ring from the support rollers after the metal ring has been released from the stretched state by reducing the distance between the support rollers with the support roller moving means.

However, the conventional process has been low in efficiency because the metal ring needs to be manually loaded and unloaded each time it is processed by the rolling mill or the circumferential length correcting machine.

Furthermore, since a metal ring is resilient, it is difficult to keep the metal ring in a substantially elliptical shape that corresponds to a supporting shape provided by the support rollers when the metal ring is to be supported on the support rollers. When the metal ring is removed from the support rollers, inasmuch as the metal ring is no longer stretched by the support rollers, the metal ring abruptly recovers its original substantially circular shape from the substantially elliptical shape. At this time, the metal ring tends to contact other members and be damaged thereby. For the above reasons, it has been highly tedious and time-consuming to load metal rings into and unload metal rings from the rolling mill or the circumferential length correcting machine.

It is therefore an object of the present invention to provide an apparatus for loading and unloading a metal ring quickly and highly accurately with increased efficiency.

DISCLOSURE OF THE INVENTION

According to the present invention, there is provided a metal ring loading and unloading apparatus for loading and unloading a metal ring in the form of a resilient endless strip, for use in an apparatus having a pair of support rollers for supporting the metal ring in a substantially elliptical shape and support roller moving means for moving at least one of the support rollers away from the other support roller to impart given tension to the metal ring, the metal ring loading and unloading apparatus comprising a ring loading device for loading the metal ring onto the support rollers and a ring unloading device for unloading the metal ring from the support rings. The ring loading device has a loaded ring placement unit for positioning and placing the metal ring and loaded ring delivering means for delivering the metal ring from the loaded ring placement unit to a position surrounding the support rollers, the loaded ring placement unit having pressing means for pressing the positioned metal ring radially releasably to resiliently deform the metal ring into a substantially elliptical shape including a pair of arcs having a radius of curvature greater than the support roller and a pair of chords extending substantially parallel to each other in confronting relation to each other with the arcs interposed therebetween, the loaded ring delivering means having loaded ring gripping means for engaging outer side surfaces of the chords of the metal ring deformed by the pressing means, thereafter pressing and holding the metal ring under recovering resiliency of the metal ring released from the pressing means, and releasing the metal ring to transfer the metal ring onto the support ring when the metal ring is delivered to the position surrounding the support rollers by the loaded ring delivering means, and also when the support rollers are moved away from each other by the support roller moving means to reduce the radius of curvature of the arcs along the support rollers.

In the metal ring loading and unloading apparatus according to the present invention, the ring loading device loads a metal ring. Specifically, a metal ring positioned and placed on the loaded ring placement unit is pressed by the pressing means. The pressing means radially presses the metal ring to resiliently deform the metal ring into a substantially elliptical shape including a pair of arcs having a radius of curvature greater than the support roller and a pair of chords extending substantially parallel to each other in confronting relation to each other with the arcs interposed therebetween.

Then, the deformed metal ring is gripped by the loaded ring gripping means of the loaded ring delivering means. The loaded ring gripping means engages outer side surfaces of the chords of the metal ring deformed by the pressing means, and grips the metal ring when it is released from the pressing means. Specifically, when the metal ring is deformed by the pressing means, it develops recovering resiliency in a direction to spread the chords of the metal ring. The loaded ring gripping means then limits, from outside, the chords of the metal ring. When released from the pressing means, the chords of the metal ring resiliently springs back against the loaded ring gripping means. The metal ring thus gripped by the loaded ring gripping means is then delivered to the position surrounding the support rollers by the loaded ring delivering means. At this time, since the metal ring deformed into the substantially elliptical shape has its arcs whose radius of curvature is greater than the support rollers, the metal ring is positioned around the support rollers out of contact therewith.

Then, the support rollers are moved apart from each other by the support roller moving means. The metal ring gripped by the loaded ring gripping means has its arcs brought into contact with the support rollers, and their radius of curvature becomes smaller along the support rollers. The distance between the chords is reduced, causing the chords to be released from the loaded ring gripping means. The metal ring is now released from the loaded ring gripping means, whereupon the loading of the metal ring onto the support rollers with the ring loading device is completed.

As described above, the metal ring is highly accurately deformed into the shape trained around the support rollers by the pressing means, and the loaded ring gripping means is of a simple structure capable of reliably gripping the metal ring in the substantially elliptical shape. Since the metal ring gripped by the loaded ring gripping means is quickly and accurately trained and loaded into position as the support rollers are spaced apart from each other, the efficiency with which the metal ring is loaded is greatly increased.

The ring unloading device has unloaded ring gripping means for confronting outer side surfaces of a pair of chords, disposed between the support rollers, of the metal ring trained around the support rollers, and pressing the outer side surfaces of the chords under recovering resiliency of the metal ring to grip the metal ring when the support rollers are moved toward each other, unloaded ring delivering means for moving the unloaded ring gripping means which has gripped the metal ring to deliver the metal ring to an unloading position, an unloaded ring placement unit disposed in the unloading position for placing the metal ring which is unloaded, and releasing means disposed in the unloaded ring placement unit for engaging the metal ring gripped by the unloaded ring gripping means and releasing the metal ring from the unloaded ring gripping means.

In the metal ring loading and unloading apparatus according to the present invention, the metal ring is unloaded by the ring unloading device. Specifically, the unloaded ring gripping means is caused to confront the outer side surfaces of the chords, disposed between the support rollers, of the metal ring trained around the support rollers. Then, the support rollers are moved toward each other by the support roller moving means to release the metal ring from being stretched by the support rollers. The outer side surfaces of the chords of the metal ring are pressed against the unloaded ring gripping means under recovering resiliency of the metal ring when the support rollers are moved toward each other. Under the own recovering resiliency of the metal ring, the metal ring is held by the unloaded ring gripping means in a substantially elliptical shape similar to the shape of the metal ring supported on the support rollers. Even if the space around the support rollers is relatively small, the metal ring can be spaced away from the support rollers without being damaged by contact with other members.

Then, the unloaded ring delivering means moves the unloaded ring gripping means which is gripping the metal ring to the unloaded ring placement unit in the unloading position. On the unloaded ring placement unit, the metal ring is released from the unloaded ring gripping means by the releasing means. Since the metal ring is held by the unloaded ring gripping means under its own recovering resiliency, the metal ring can easily be released from being gripped by the unloaded ring gripping means simply when the metal ring is engaged by the releasing means and pulled from the unloaded ring gripping means.

With the ring unloading device according to the present invention, as described above, the unloaded ring gripping means is of a simple structure capable of reliably and quickly gripping and unloading the metal ring which has been released from being stretched by the support rollers. The efficiency with which the metal ring is unloaded is increased.

The metal ring loading and unloading apparatus further comprises a rail extending from the loaded ring placement unit to the unloaded ring placement unit perpendicularly to respective axes of the support rollers, and moving means for moving along the rail, the loaded ring delivering means and the unloaded ring delivering means being integrally mounted on the moving means.

Inasmuch as the loaded ring delivering means and the unloaded ring delivering means are mounted on the moving means and movable together along the rail, the metal ring can be loaded by the loaded ring delivering means and the metal ring can be unloaded by the unloaded ring delivering means in synchronism. Specifically, while the moving means is moving toward the loaded ring placement unit and the loaded ring delivering means is gripping the ring on the loaded ring placement unit, the unloaded ring delivering means moves the metal ring away from the support rollers. Then, the moving means moves toward the unloaded ring placement unit, and the loaded ring gripping means installs the metal ring onto the support rollers. The releasing means of the unloaded ring placement unit releases the metal ring from the unloaded ring gripping means and places the metal ring on the unloaded ring placement unit. In this manner, the metal ring can be loaded and unloaded efficiently in a short period of time for greatly increased efficiency.

The loaded ring gripping means preferably has clamp means for gripping portions of at least the chords of the metal ring from inner and outer side surfaces thereof. The unloaded ring gripping means preferably has clamp means for gripping portions of at least the chords of the metal ring from inner and outer side surfaces thereof.

With the above arrangement, if the recovering resiliency which the metal ring has is relatively weak, since the metal ring can reliably be gripped by the clamp means, the loaded ring delivering means and the unloaded ring delivering means can be moved at a high speed while preventing the metal ring securely from being detached from the loaded ring gripping means and the unloaded ring gripping means. The time required to deliver the metal ring can be shortened for increased efficiency.

Preferably, the loaded ring placement unit has sheet width measuring means for measuring a sheet width of the metal ring on a flat surface when the metal ring is placed on the flat surface and radially pressed and deformed into the substantially elliptical shape by the pressing means.

Before the metal ring is placed on the loaded ring placement unit, the metal ring is polished to remove burrs or edgy protrusions on its circumferential edges. However, if the metal ring is polished insufficiently, the sheet width of the metal ring may possibly be greater than a standard dimension, and if the metal ring is polished excessively, the sheet width of the metal ring may possibly be smaller than the standard dimension. In order to make the metal ring highly accurate, therefore, it is preferable to measure the sheet width highly accurately for determining whether the sheet width is the same as the standard dimension. According to the present invention, therefore, the loaded ring placement unit has the sheet width measuring means for highly accurately measuring the sheet width of the metal ring. Specifically, when the metal ring placed on the loaded ring placement unit is pressed by the pressing means, the metal ring is deformed into the substantially elliptical shape, as described above. At this time, the sheet of the metal ring lies substantially perpendicularly to the flat surface, and the metal ring develops recovering resiliency to prevent the metal ring from being deformed along the sheet thereof. Then, the sheet width measuring means measures the sheet width of the metal ring on the flat surface. The sheet width of the metal ring can thus be measured exactly even if the sheet thickness is too small for the metal ring to hold itself.

The unloaded ring placement unit preferably has a guard wall for limiting, from outside, the metal ring which is resiliently expanded into a circular shape when released from the unloaded ring gripping means by the releasing means.

Since the metal ring is held under its own recovering resiliency by the unloaded ring gripping means, when the metal ring is released from the unloaded ring gripping means by the releasing means, the metal ring tends to leap or make a violent motion under its own recovering resiliency, and jump out of the unloaded ring placement unit. The guard wall is effective to keep the metal ring released from the unloaded ring gripping means reliably within the unloaded ring placement unit, thus preventing the metal ring from jumping out of the unloaded ring placement unit.

The apparatus with the pair of support rollers and the support roller moving means comprises a circumferential length correcting machine for correcting the metal ring to have a predetermined circumferential length by supporting the metal ring on the support rollers and moving one of the support rollers away from the other support roller with the support roller moving means thereby imparting tension to the metal ring. Alternatively, the apparatus with the pair of support rollers and the support roller moving means comprises a rolling mill for rolling the metal ring to have a predetermined circumferential length by supporting the metal ring on the support rollers and moving the one of the support rollers away from the other support roller with the support roller moving means thereby imparting tension to the metal ring.

The above and other objects, features, and advantages of the present invention will become apparent from the following description when taken in conjunction with the accompanying drawings which illustrate preferred embodiments of the present invention by way of example.

BEST MODE FOR CARRYING OUT THE INVENTION

Figure 1:
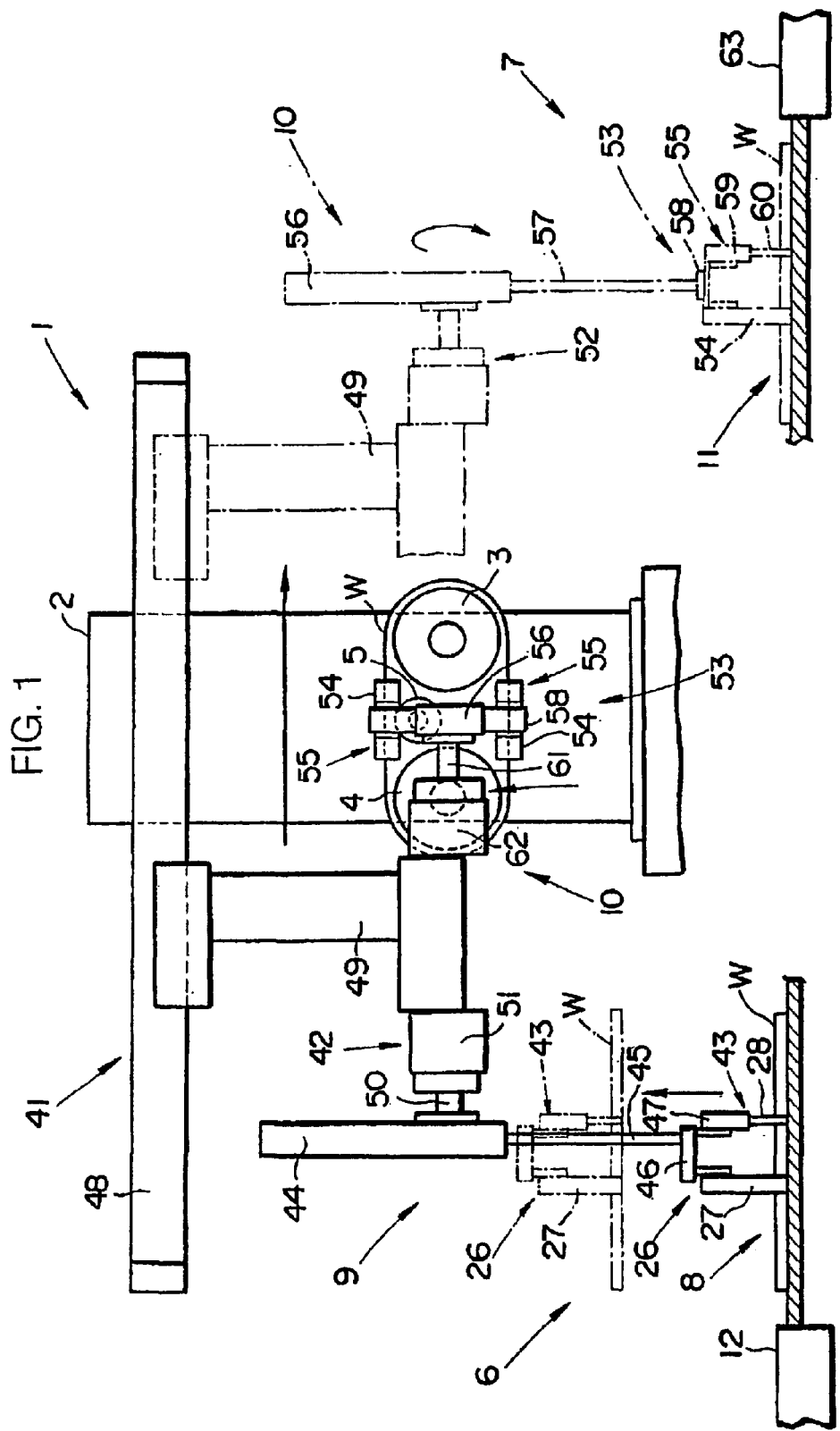
FIG. 1 is an elevational view of a metal ring loading and unloading apparatus according to an embodiment of the present invention.

As shown in FIG. 1, a metal ring loading and unloading apparatus 1 according to an embodiment of the present invention serves to support a metal ring W in the form of a resilient endless strip on a drive roller 3 and a driven roller 4 of a circumferential length correcting machine 2 and also to unload the metal ring W from the drive roller 3 and the driven roller 4. The circumferential length correcting machine 2 also has a correcting roller 5 disposed vertically movably between the drive roller 3 and the driven roller 4. The correcting roller 5 is vertically moved by a lifting and lowering means (not shown) to correct the circumferential length of the metal ring W that is trained around the drive roller 3 and the driven roller 4. The drive roller 4 is horizontally moved away from the drive roller 3 by a roller moving means (not shown) to apply tension to the metal ring W when the circumferential length of the metal ring W is corrected.

The metal ring loading and unloading apparatus 1 has a ring loading device 6 and a ring unloading device 7. The ring loading device 6 comprises a flat loaded ring placement unit 8 for positioning and placing a metal ring W thereon and a loaded ring delivering means 9 for gripping and delivering the metal ring W on the loaded ring placement unit 8. The ring unloading device 7 comprises an unloaded ring delivering means 10 for gripping and unloading a metal ring W supported on the drive roller 3 and the driven roller 4 and an unloaded ring placement unit 11 disposed in an unloading position for placing thereon the metal ring W that has been delivered by the unloaded ring delivering means 10.

Figure 2:
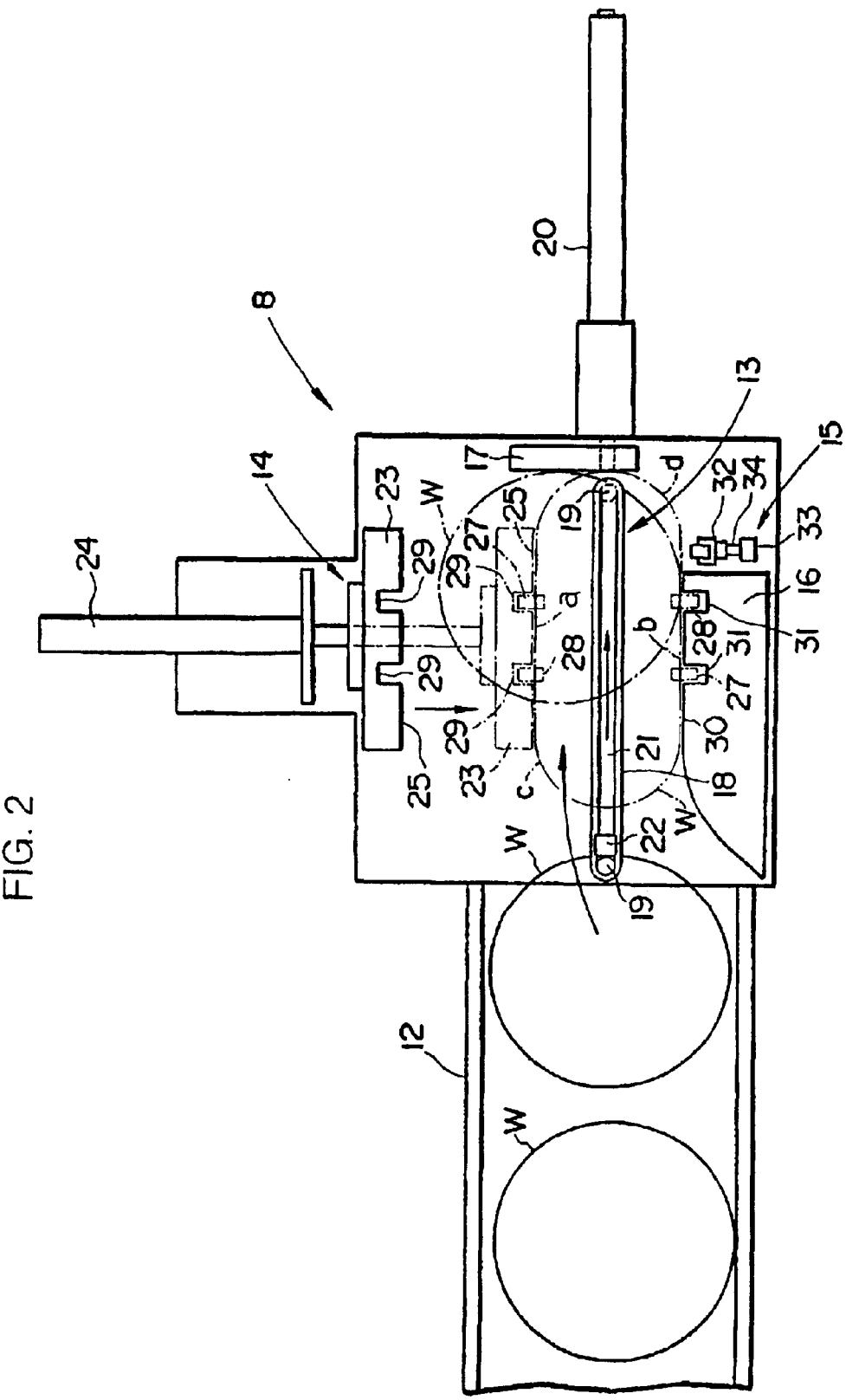
FIG. 2 is a plan view of a loaded ring placement unit of the metal ring loading and unloading apparatus.

As shown in FIG. 2, the loaded ring placement unit 8 is disposed at a terminal end of a first feed passage 12 which comprises a conveyor or the like. The loaded ring placement unit 8 comprises a drawing means 13 for drawing a metal ring W fed along the first feed passage 12 onto the loaded ring placement unit 8, a pressing means 14 for pressing, from one side, the metal ring W that has been drawn onto the loaded ring placement unit 8 by the drawing means 13, into a substantially elliptical shape, and a sheet width measuring means 15 for measuring a sheet width of the metal ring W disposed on the loaded ring placement unit 8. The loaded ring placement unit 8 also has a guide block 16 disposed on a side thereof opposite to the pressing means 14 and an abutment block 17 disposed at a terminal end of a stroke over which the metal ring W is drawn by the drawing means 13.

The drawing means 13 comprises an engaging member 19 movable into and out of a slit 18 defined in and extending through the loaded ring placement unit 8 and a cylinder 20 for moving the engaging member 19 along the slit 18. The engaging member 19 is mounted on a projecting and retracting means 22 disposed on the distal end of a piston rod 21 of the piston 20. The engaging member 19 can be projected into and retracted from the slit 18 by the projecting and retracting means 22.

The pressing means 14 comprises a movable block 23 for abutting against one side of the metal ring W to press the metal ring W and a cylinder 24 for moving the movable block 23 toward and away from the guide block 16.

The movable block 23 has a chord forming surface 25 for forming a linear chord a in the metal ring W by abutting flatwise against a side of the metal ring W, and a pair of recesses 29 for receiving therein a finger member 27 and a clamp member 28 of a loaded ring gripping means 26 (see FIG. 1) to be described later on. The guide block 16 which is disposed in confronting relation to the movable block 23 also has a chord forming surface 30 for forming a linear chord b in the metal ring W by abutting flatwise against an opposite side of the metal ring W, and a pair of recesses 31 for receiving therein another finger member 27 and another clamp member 28 of the loaded ring gripping means 26.

Figure 3:
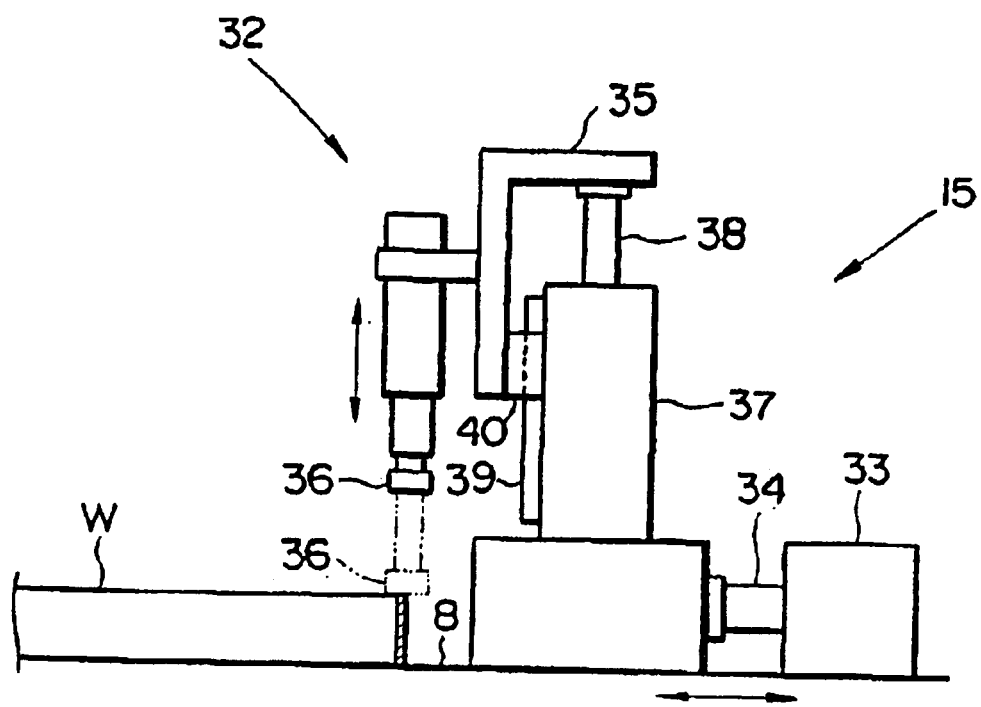
FIG. 3 is an elevational view of a sheet width measuring means of the metal ring loading and unloading apparatus.

As shown in FIGS. 2 and 3, the sheet width measuring means 15 comprises a measuring device 32 disposed in a position between the guide block 16 and the abutment block 17, for measuring a sheet width of the metal ring W, and a cylinder 33 for moving the measuring device 32 toward and away from the metal ring W which is pressed against the movable block 23. The measuring device 32 is mounted on the distal end of a piston rod 34 of a cylinder 33 and movable thereby.

As shown in FIG. 3, the measuring device 32 comprises a measuring probe 36 mounted on a bracket 35 and positioned above the metal ring W and a cylinder 37 for vertically moving the measuring probe 36. The bracket 35 is mounted on the distal end of a piston rod 38 of a cylinder 37. The cylinder 37 supports a vertical rail 39 mounted on a side thereof, and the bracket 35 is vertically movable by a slider 40 which is slidable along the rail 39.

As shown in FIG. 1, the loaded ring delivering means 9 has a loaded ring gripping means 26, and is coupled by a first rotating means 42 to a moving means 41 for moving the loaded ring gripping means 26 in a direction to deliver the metal ring W.

Figure 4:
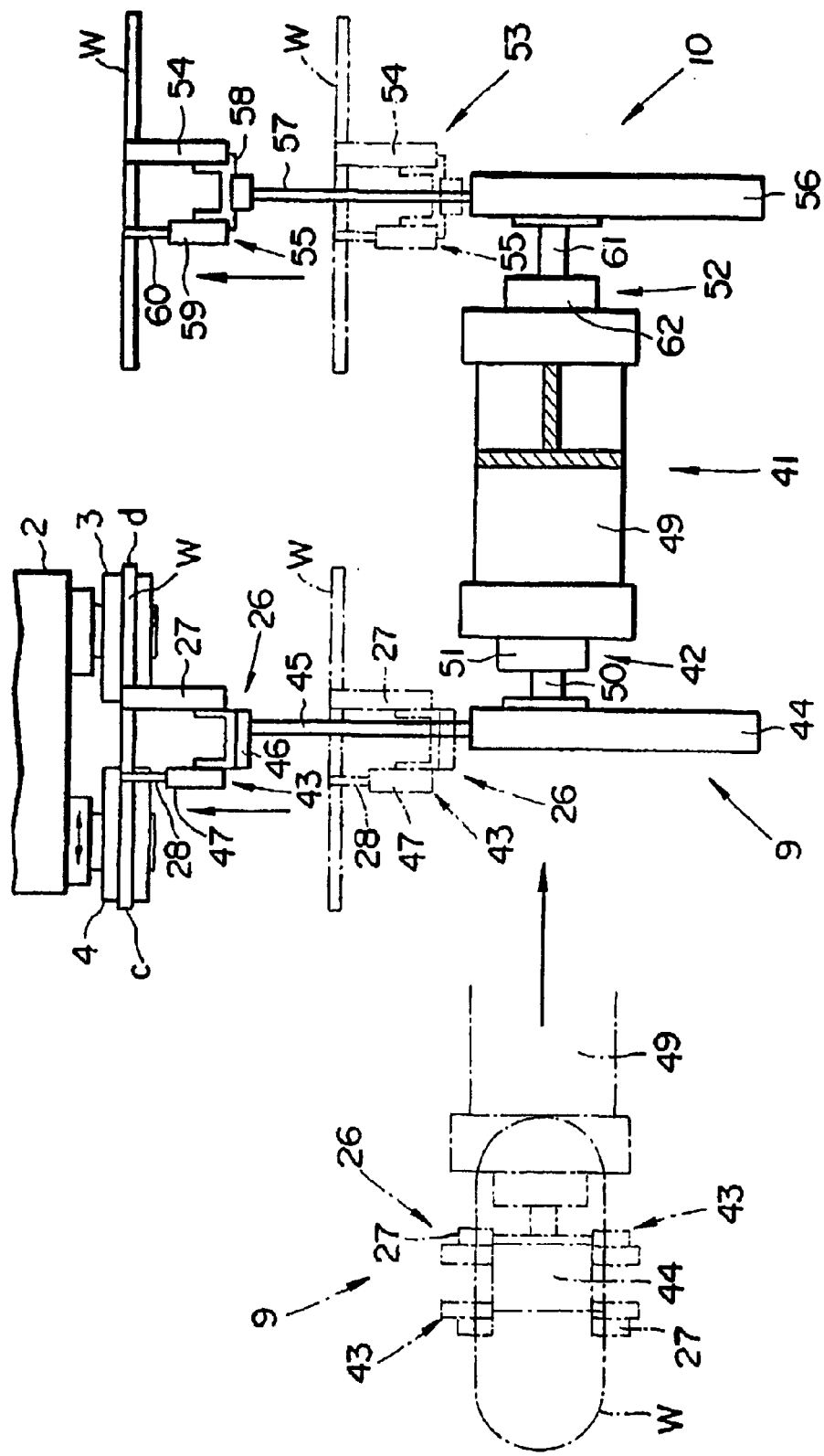
FIG. 4 is a plan view showing an arrangement and operation of a loaded ring delivering means of the metal ring loading and unloading apparatus.

As shown in FIGS. 1 and 4, the loaded ring gripping means 26 comprises a pair of fingers 27, a pair of clamp means 43, and a cylinder 44 for moving the fingers 27 and the clamp means 43 toward and away from the loaded ring placement unit 8. The fingers 27 and the clamp means 43 are disposed in confronting relation to each other and spaced from each other by a given distance, and are integrally fixed to the distal end (lower end) of a piston rod 45 of the cylinder 44 by a support plate 46. The clamp means 43 comprise a pair of respective drive units 47 coupled to the support plate 46 and a pair of respective clamp members 28 that can be opened and closed by the drive units 47.

As shown in FIG. 1, the moving means 41 comprises a rail 48 extending in a direction in which the metal ring W is delivered, a slide frame 49 mounted on the rail 48 for sliding movement therealong, and a drive means (not shown) for moving the slide frame 49 along the rail 48.

The first rotating means 42 is disposed between the slide frame 49 and the cylinder 44, and comprises a rotatable shaft 50 and a drive means 51 such as a rotary actuator or the like for rotating the rotatable shaft 50 about its own axis. As shown in FIG. 4, the first rotating means 42 can rotate the loaded ring gripping means 26 to turn the metal ring W to face the drive roller 3 and the driven roller 4.

The unloaded ring delivering means 10 is connected to the moving means 41 by a second rotating means 52. The unloaded ring delivering means 10 has an unloaded ring gripping means 53 for gripping the metal ring W in a position which faces the metal ring W that is supported on the drive roller 3 and the driven roller 4.

Figure 5:
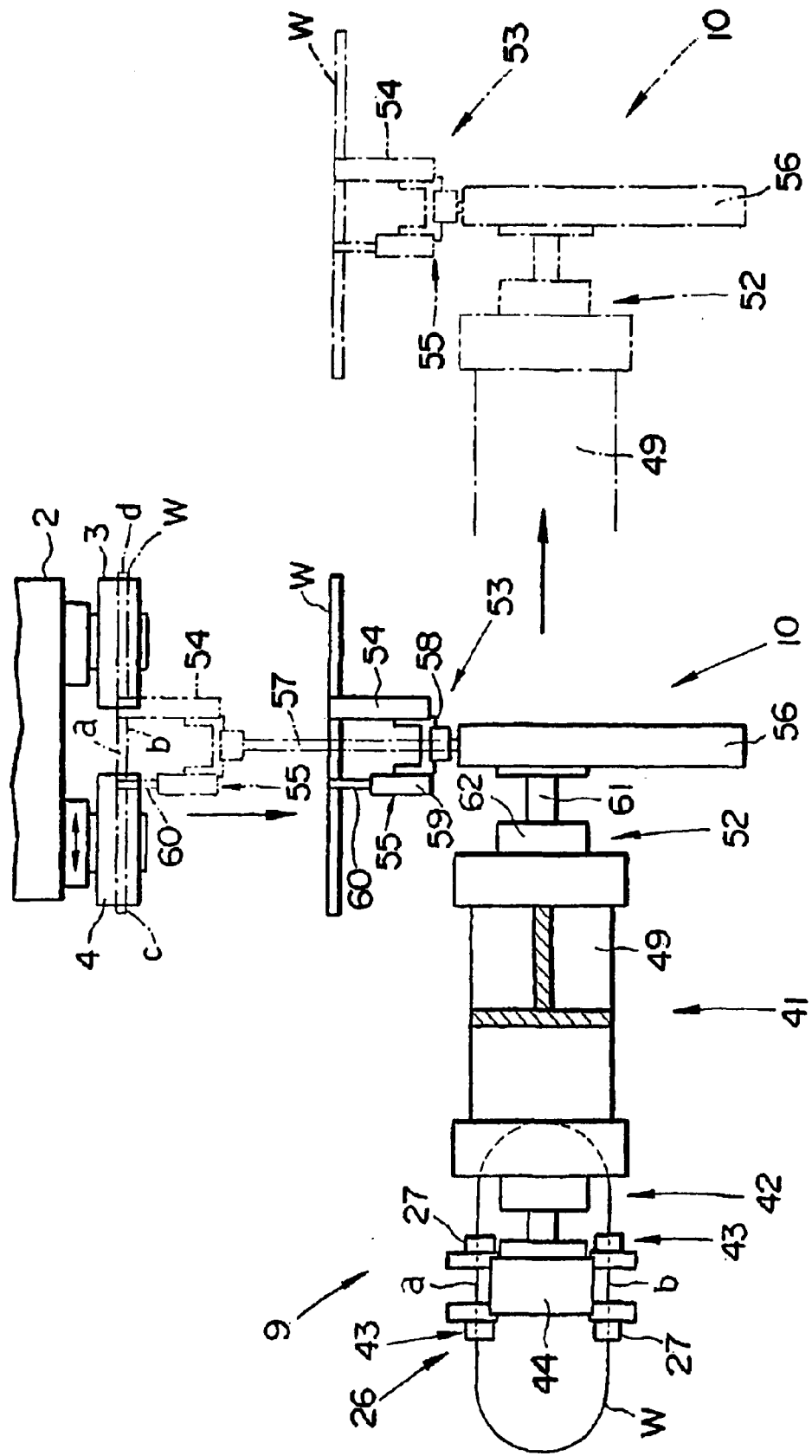
FIG. 5 is a plan view showing an arrangement and operation of an unloaded ring delivering means of the metal ring loading and unloading apparatus.
Figure 6:
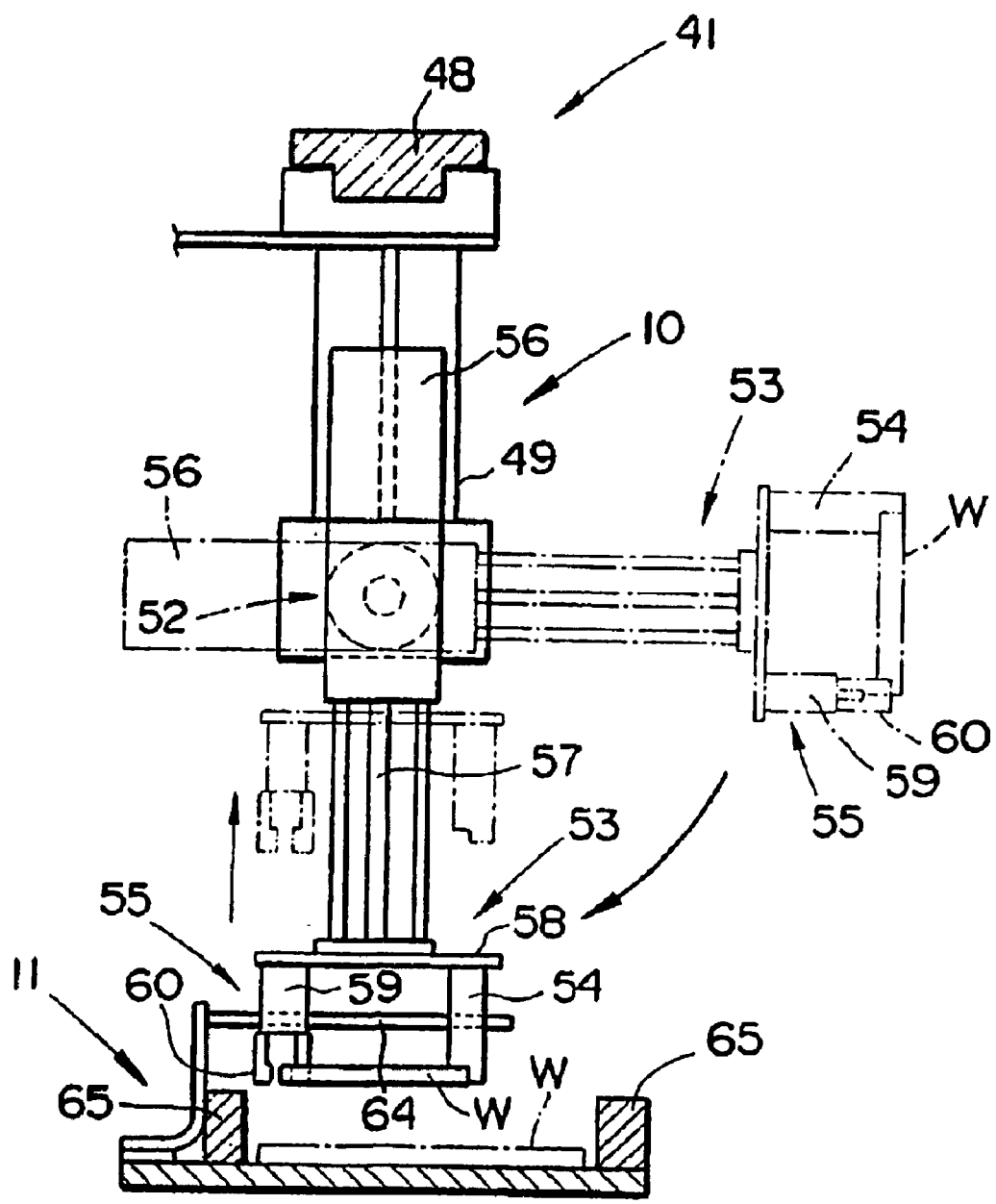
FIG. 6 is a plan view of an unloaded ring placement unit of the metal ring loading and unloading apparatus.

As shown in FIGS. 5 and 6, the unloaded ring gripping means 53 comprises a pair of fingers 54, a pair of clamp means 55, and a cylinder 56 for moving the fingers 54 and the clamp means 55 toward and away from the metal ring W that is supported on the drive roller 3 and the driven roller 4. The fingers 54 and the clamp means 55 are disposed in confronting relation to each other and spaced from each other by a given distance, and are integrally fixed to the distal end (lower end) of a piston rod 57 of the cylinder 56 by a support plate 58. The clamp means 55 comprise a pair of respective drive units 59 coupled to the support plate 58 and a pair of respective clamp members 60 that can be opened and closed by the drive units 59.

As shown in FIG. 5, the second rotating means 52 is disposed between the slide frame 49 and the cylinder 56, and comprises a rotatable shaft 61 and a drive means 62 such as a rotary actuator or the like for rotating the rotatable shaft 61 about its own axis. As shown in FIG. 6, the second rotating means 52 can rotate the unloaded ring gripping means 53 to turn the metal ring W to face the unloaded ring placement unit 11 from above.

As shown in FIG. 1, the unloaded ring placement unit 11 is disposed at a beginning end of a second feed passage 63 which comprises a conveyor or the like. As shown in FIG. 6, the unloaded ring placement unit 11 comprises a releasing means 64 for engaging the metal ring W gripped by the unloaded ring gripping means 53 and releasing the metal ring from the unloaded ring gripping means 53, and a guard wall 65 for preventing the metal ring W from jumping out of the unloaded ring placement unit 11 due to the recovering resiliency of the metal ring W when the metal ring W is released from the unloaded ring gripping means 53.

Operation of the metal ring loading and unloading apparatus 1 thus constructed will be described below. As shown in FIG. 2, when a metal ring W is fed to the terminal end of the first feed passage 12, the engaging member 19 projects through the slit 18 into engagement with an inner circumferential surface of the metal ring W. Then, the cylinder 20 is actuated to retract the piston rod 21 to move the engaging member 19 toward the end of the slit 18 near the abutment block 17. The metal ring W engaged by the engaging member 19 is brought into abutment against the abutment block 17, and drawn and positioned between the movable block 23 of the pressing means 14 and the guide block 16.

Then, the cylinder 24 is actuated to move the movable block 23 toward the guide block 16, pressing the metal ring W against the guide block 16 thereby to deform the metal ring W into a substantially elliptical shape. As indicated by the imaginary lines in FIG. 2, the chord forming surface 25 of the movable block 23 and the chord forming surface 30 of the guide block 16 produce parallel confronting chords a, b connected by a pair of arcs c, d in the metal ring W. The arcs c, d have respective radii of curvature which are greater than the outside radii of the drive and driven rollers 3, 4.

When the metal ring W is thus deformed into the substantially elliptical shape, then, as shown in FIG. 3, the measuring device 32 is moved by the cylinder 33 toward the metal ring W until the measuring probe 36 is positioned upwardly of the deformed metal ring W.

Then, the cylinder 37 is actuated to cause the bracket 35 to lower the measuring probe 36 toward the metal ring W. At this time, the metal ring W is sandwiched and pressed between the movable block 23 and the guide block 16, and has its sheet plane directed substantially perpendicularly to the horizontal surface of the loaded ring placement unit 8 and develops resiliency to recover its original shape. The metal ring W is now prevented from being deformed vertically in the direction along its sheet. The measuring device 32 measures the sheet width of the metal ring W on the horizontal surface of the loaded ring placement unit 8 by measuring the displacement of the probe 36 until it engages the upper edge of the metal ring W. After the sheet width of the metal ring W is detected, the cylinder 37 is actuated to move the measuring probe 36 upwardly out of engagement with the upper edge of the metal ring W, and the cylinder 33 is actuated to retract the measuring device 32 away from the metal ring W. If the measured sheet width falls within a range of prescribed dimensions, then the metal ring W is delivered to the circumferential length correcting machine 2 by the loaded ring delivering means 9. If the measured sheet width does not fall within the range of prescribed dimensions, then the metal ring W is discharged from the loaded ring placement unit 8 by a discharging means (not shown).

In the present embodiment, the sheet width measuring means 15 is disposed between the guide block 16 and the abutment block 17. However, the sheet width measuring means 15 may be located in any position, such as between the abutment block 17 and the movable block 23, insofar as the operation of the sheet width measuring means 15 is not obstructed by the blocks 16, 17, 23.

If the measured sheet width falls within the range of prescribed dimensions, then, as shown in FIG. 1, the clamp means 43 with the fingers 27 and the clamp members 28 being open is lowered toward the metal ring W by the cylinder 44. At this time, as indicated by the imaginary lines in FIG. 2, the fingers 27 and the clamp members 28 are inserted respectively into the recesses 29 in the movable block 23 and the recesses 31 in the guide block 16, and held against the respective chords a, b of the metal ring W that has been deformed into the substantially elliptical shape.

Then, as shown in FIG. 2, the movable block 23 is retracted by the cylinder 24. Even though the metal ring W is released from the movable block 23, the metal ring W remains in the substantially elliptical shape because it is engaged by the fingers 27. At this time, the metal ring W is pressed against the fingers 27 due to its recovering resiliency, and gripped by the fingers 27. At the same time, the clamp members 28 are closed, causing the loaded ring gripping means 26 to hold the metal ring W securely against unwanted removal. The arcs c, d of the metal ring W are maintained in a curved state with their radii of curvature being greater than the outside radii of the drive and driven rollers 3, 4.

As indicated by the imaginary lines in FIG. 1, the fingers 27 and the clamp members 43 which are gripping the metal ring W are lifted by the cylinder 44, and then delivered by the moving means 41 to the position confronting the drive roller 3 and the driven roller 4.

Then, as shown in FIG. 4, the first rotating means 42 rotates the loaded ring gripping means 26, and the cylinder 44 of the loaded ring gripping means 26 is actuated to move the metal ring W toward the circumferential length correcting machine 2 until the metal ring W reaches a position surrounding the drive roller 3 and the driven roller 4. At this time, since the arcs c, d of the metal ring W have their radii of curvature greater than the outside radii of the drive and driven rollers 3, 4, the arcs c, d surround the drive and driven rollers 3, 4 without contacting the drive and driven rollers 3, 4. Then, the clamp members 28 of the clamp means 43 are opened.

The roller moving means is actuated to move the driven roller 4 horizontally away from the drive roller 3. The arcs c, d of the metal ring W are curved and extended into smaller radii along the drive and driven rollers 3, 4, reducing the distance between the chords a, b which are released from the fingers 27 and the clamp members 28. The metal ring W is now released from the loaded ring gripping means 26, and fully loaded in the position on the drive and driven rollers 3, 4.

The fingers 27 and the clamp members 28 which have released the metal ring W are retracted by the cylinder 44. The loaded ring gripping means 26 is rotated by the first rotating means 42 and returned to the position above the loaded ring placement unit 8. Thereafter, the circumferential length of the metal ring W is corrected by the circumferential length correcting machine 2.

The loading of the metal ring W with the loaded ring delivering means 9 has been described above. Since the unloaded ring delivering means 10 is coupled to the loaded ring delivering means 9 by the moving means 41, a metal ring W can be unloaded by the unloaded ring delivering means 10 at the same time that a metal ring W is loaded by the loaded ring delivering means 9. A process of unloading a metal ring W with the unloaded ring delivering means 10 will be described below.

When the correction of the circumferential length of the metal ring W with the circumferential length correcting machine 2 is finished, as shown in FIG. 5, the unloaded ring gripping means 53 of the unloaded ring delivering means 10 is moved by the cylinder 53 toward the metal ring W supported on the drive and driven rollers 3. 4. The fingers 54 of the unloaded ring gripping means 53 are positioned outside of the respective chords a, b of the metal ring W, and the clamp members 60 which are open of the clamp means 55 confront each other across portions of the chords a, b.

Then, the driven roller 4 is moved toward the drive roller 3, releasing the metal ring W whose chords a, b spring apart into pressed contact with the fingers 54 under the recovering resiliency of the metal ring W. The metal ring W is spaced radially outwardly from the drive and driven rollers 3, 4, and gripped by the fingers 54. At the same time, the clamp means 55 are operated to clamp portions of the chords a, b.

Then, the cylinder 56 is actuated to retract the unloaded ring gripping means 53 away from the drive and driven rollers 3, 4. At this time, since the metal ring W is gripped by the fingers 54 of the unloaded ring gripping means 53, with portions of the chords a, b being clamped by the clamp means 55, the metal ring W is kept in the substantially elliptical shape and held against unwanted removal when the metal ring W is spaced away from the drive and driven rollers 3, 4, Thus, the metal ring W is protected against contact with other members. As indicated by the imaginary lines in FIG. 1, the unloaded ring gripping means 53 which is holding the metal ring W is moved to a position above the unloaded ring placement unit 11 by the moving means 11.

Then, as shown in FIG. 6, the unloaded ring gripping means 53 is moved forward by the cylinder 56, and turned about 90° downwardly by the second rotating means 52. As indicated by the imaginary lines in FIG. 6, the metal ring W is placed below the releasing means 64 of the unloaded ring placement unit 11. At this time, the metal ring W is unclamped by the clamp means 55. The metal ring W remains gripped by the fingers 54, but are releasable downwardly.

The unloaded ring gripping means 53 is retracted (elevated) by the cylinder 56. At this time, the releasing means 64 positioned above the metal ring W gripped by the fingers 54 engages the metal ring W, releasing the metal ring W from the fingers 54 of the unloaded ring gripping means 53, whereupon the metal ring W drops onto the unloaded ring placement unit 11. When released from the fingers 54, since the metal ring W springs back to its original shape from the substantially elliptical shape under its own recovering resiliency, the metal ring W tends to leap or make a violent motion. However, the metal ring W is prevented from jumping out of the unloaded ring placement unit 11 by the guard wall 65, and is retained within the unloaded ring placement unit 11. Then, as shown in FIG. 1, the metal ring W is unloaded from the unloaded ring placement unit 11 at the beginning end of the second feed passage 63 by the conveyor or the like of the second feed passage 63.

Thereafter, as shown in FIGS. 6 and 1, the unloaded ring gripping means 53 which has released the metal ring W and has been retracted (elevated) is turned upwardly by the second rotating means 52, and delivered back by the moving means 41 to the position that confronts the drive and driven rollers 3, 4.

As described above, the metal ring loading and unloading apparatus 1 is capable of reliably and quickly loading and unloading the metal ring W highly efficiently.

Figure 7:
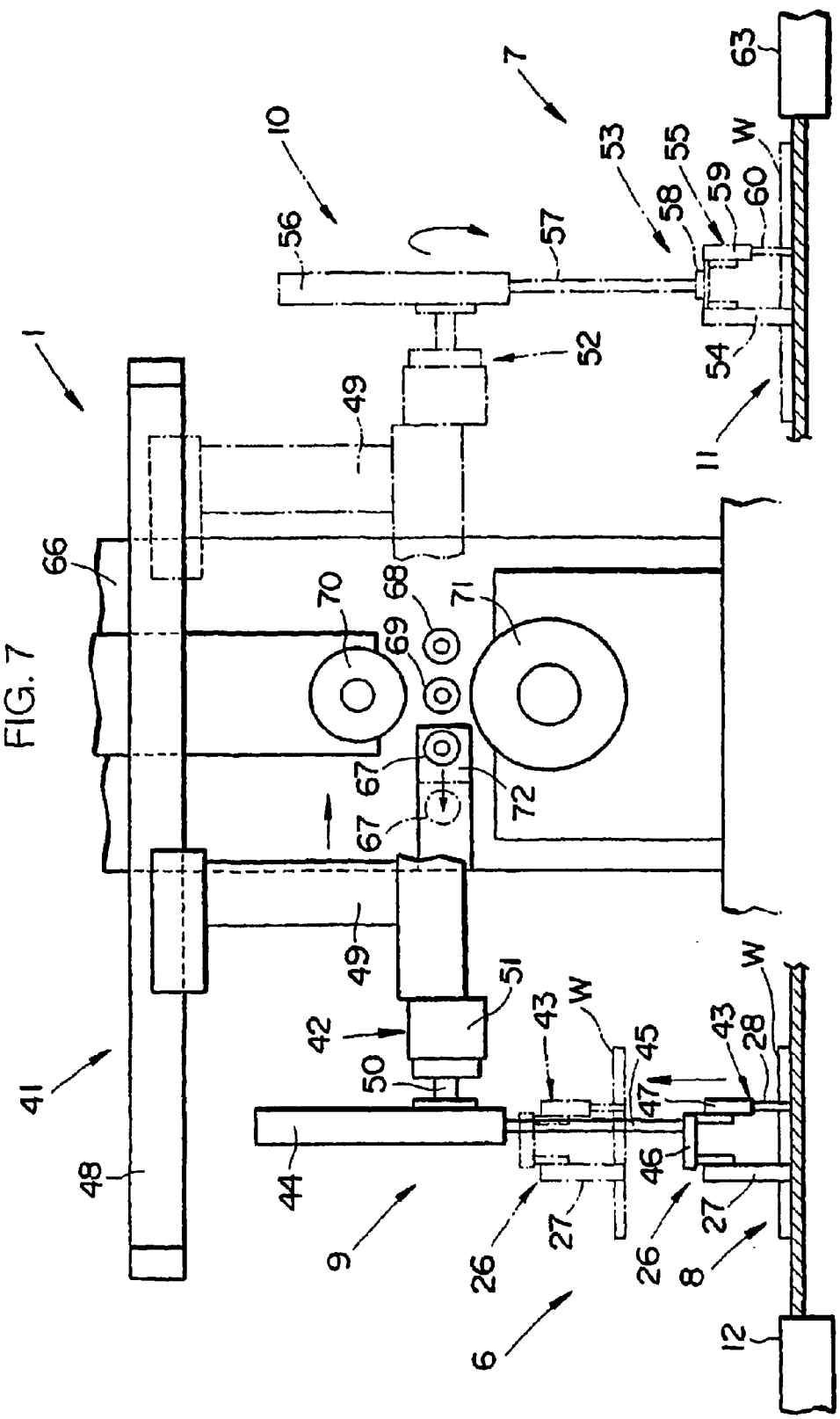
FIG. 7 is an elevational view of a metal ring loading and unloading apparatus according to another embodiment of the present invention.

In the above embodiment, the metal ring loading and unloading apparatus 1 loads the metal ring W into and unloads the metal ring W from the circumferential length correcting machine 2. However, the metal ring loading and unloading apparatus 1 may be used with an apparatus other than the metal ring loading and unloading apparatus 1 if such an apparatus has a pair of support rollers for supporting the metal ring W, such as the drive roller 3 and the driven roller 4. An apparatus other than the metal ring loading and unloading apparatus 1 may, for example, be a rolling mill 66 for rolling a metal ring W, as shown in FIG. 7. Those reference characters shown in FIG. 7 which are identical to those shown in FIG. 1 denote identical parts. The rolling mill 66 has a guide roller 69 disposed intermediate between a pair of tension rollers 67, 68 corresponding to a pair of support rollers, and a rolling roller 70 and a backup roller which are disposed in confronting positions above and below the guide roller 69, the rolling roller 70 being lowered when rolling the metal ring W. One of the tension rollers 69 is supported on a support member 72 that is horizontally movable by a roller moving means (not shown). When the metal ring W is rolled, the tension roller 69 is moved away from the other tension roller 68 to impart tension to the metal ring W.

With the metal ring loading and unloading apparatus 1 being incorporated in the rolling mill 66, the metal ring W can be loaded into and unloaded from the rolling mill 66 reliably and quickly with increased efficiency.

In the above embodiments, the clamp means 43, 55 are disposed between the loaded ring gripping means 26 and the unloaded ring gripping means 53 for reliably gripping the metal ring W against dislodgment even if the recovering resiliency of the metal ring W is relatively small. If the recovering resiliency of the metal ring W is relatively large, then the metal ring W can sufficiently be gripped by the fingers 27, 54 which are positioned in place of the clamp means 43, 55 that are dispensed with.

INDUSTRIAL APPLICABILITY

The metal ring loading and unloading apparatus according to the present invention is preferably incorporated in an apparatus having a pair of support rollers movable toward and away from each other, such as a rolling mill for rolling a metal ring or a circumferential length correcting machine for correcting the circumferential length of a metal ring. The metal ring loading and unloading apparatus is capable of loading and unloading a metal ring quickly to increase the efficiently with which to manufacture the metal ring.

What is claimed is:

1. A metal ring loading and unloading apparatus for loading and unloading a metal ring in the form of a resilient endless strip, for use in an apparatus having a pair of support rollers for supporting the metal ring in a substantially elliptical shape and support roller moving means for moving at least one of the support rollers away from the other support roller to impart a given tension to said metal ring, said metal ring loading and unloading apparatus comprising:

a ring loading device for loading the metal ring onto said support rollers; and a ring unloading device for unloading the metal ring from said support rollers;

said ring loading device having a loaded ring placement unit for positioning and placing said metal ring and loaded ring delivering means for delivering the metal ring from said loaded ring placement unit to a position surrounding said support rollers, said loaded ring placement unit having pressing means for pressing the positioned metal ring radially releasably to resiliently deform the metal ring into a substantially elliptical shape including a pair of arcs having a radius of curvature greater than said support roller and a pair of chords extending substantially parallel to each other in confronting relation to each other with said arcs interposed therebetween, said loaded ring delivering means having loaded ring gripping means for engaging outer side surfaces of said chords of the metal ring deformed by said pressing means, thereafter pressing and holding said metal ring under recovering resiliency of the metal ring released from said pressing means, and releasing said metal ring to transfer the metal ring onto said support ring when said metal ring is delivered to said position surrounding said support rollers by said loaded ring delivering means, and also when said support rollers are moved away from each other by said support roller moving means to reduce the radius of curvature of said arcs along said support rollers.

2. A metal ring loading and unloading apparatus according to claim 1, wherein said loaded ring gripping means has clamp means for gripping portions of at least said chords of said metal ring from inner and outer side surfaces thereof.

3. A metal ring loading and unloading apparatus according to claim 1, wherein said loaded ring placement unit has sheet width measuring means for measuring a sheet width of said metal ring on a flat surface when said metal ring is placed on said flat surface and radially pressed and deformed into said substantially elliptical shape by said pressing means.

4. A metal ring loading and unloading apparatus according to claim 1, wherein said apparatus comprises a circumferential length correcting machine for correcting said metal ring to have a predetermined circumferential length by supporting said metal ring on said support rollers and moving said one of the support rollers away from said other support roller with said support roller moving means thereby imparting a tension to said metal ring.

5. A metal ring loading and unloading apparatus according to claim 1, wherein said apparatus comprises a rolling mill for rolling said metal ring to have a predetermined circumferential length by supporting said metal ring on said support rollers and moving said one of the support rollers away from said other support roller with said support roller moving means thereby imparting a tension to said metal ring.

6. A metal ring loading and unloading apparatus for loading and unloading a metal ring in the form of a resilient endless strip, for use in an apparatus having a pair of support rollers for supporting the metal ring in a substantially elliptical shape and support roller moving means for moving at least one of the support rollers away from the other support roller to impart a given tension to said metal ring, said metal ring loading and unloading apparatus comprising:

a ring loading device for loading the metal ring onto said support rollers; and a ring unloading device for unloading the metal ring from said support rollers;

said ring unloading device having unloaded ring gripping means for confronting outer side surfaces of a pair of chords, disposed between said support rollers, of the metal ring trained around the support rollers, and pressing the outer side surfaces of said chords under recovering resiliency of the metal ring to grip said metal ring when said support rollers are moved toward each other, unloaded ring delivering means for moving said unloaded ring gripping means which has gripped said metal ring to deliver said metal ring to an unloading position, an unloaded ring placement unit disposed in said unloading position for placing said metal ring which is unloaded, and releasing means disposed in said unloaded ring placement unit for engaging the metal ring gripped by said unloaded ring gripping means and releasing the metal ring from said unloaded ring gripping means.

7. A metal ring loading and unloading apparatus according to claim 6, wherein said unloaded ring placement unit has a guard wall for limiting, from outside, the metal ring which is resiliently expanded into a circular shape when released from said unloaded ring gripping means by said releasing means.

8. A metal ring loading and unloading apparatus according to claim 6, wherein said unloaded ring gripping means has clamp means for gripping portions of at least said chords of said metal ring from inner and outer side surfaces thereof.

9. A metal ring loading and unloading apparatus according to claim 6, wherein said apparatus comprises a circumferential length correcting machine for correcting said metal ring to have a predetermined circumferential length by supporting said metal ring on said support rollers and moving said one of the support rollers away from said other support roller with said support roller moving means thereby imparting a tension to said metal ring.

10. A metal ring loading and unloading apparatus according to claim 6, wherein said apparatus comprises a rolling mill for rolling said metal ring to have a predetermined circumferential length by supporting said metal ring on said support rollers and moving said one of the support rollers away from said other support roller with said support roller moving means thereby imparting a tension to said metal ring.

11. A metal ring loading and unloading apparatus for loading and unloading a metal ring in the form of a resilient endless strip, for use in an apparatus having a pair of support rollers for supporting the metal ring in a substantially elliptical shape and support roller moving means for moving at least one of the support rollers away from the other support roller to impart a given tension to said metal ring, said metal ring loading and unloading apparatus comprising:

a ring loading device for loading the metal ring onto said support rollers; and a ring unloading device for unloading the metal ring from said support rollers;

said ring loading device having a loaded ring placement unit for positioning and placing said metal ring and loaded ring delivering means for delivering the metal ring from said loaded ring placement unit to a position surrounding said support rollers, said loaded ring placement unit having pressing means for pressing the positioned metal ring radially releasably to resiliently deform the metal ring into a substantially elliptical shape including a pair of arcs having a radius of curvature greater than said support roller and a pair of chords extending substantially parallel to each other in confronting relation to each other with said arcs interposed therebetween, said loaded ring delivering means having loaded ring gripping means for engaging outer side surfaces of said chords of the metal ring deformed by said pressing means, thereafter pressing and holding said metal ring under recovering resiliency of the metal ring released from said pressing means, and releasing said metal ring to transfer the metal ring onto said support ring when said metal ring is delivered to said position surrounding said support rollers by said loaded ring delivering means, and also when said support rollers are moved away from each other by said support roller moving means to reduce the radius of curvature of said arcs along said support rollers;

said ring unloading device having unloaded ring gripping means for confronting outer side surfaces of a pair of chords, disposed between said support rollers, of the metal ring trained around the support rollers, and pressing the outer side surfaces of said chords under recovering resiliency of the metal ring to grip said metal ring when said support rollers are moved toward each other, unloaded ring delivering means for moving said unloaded ring gripping means which has gripped said metal ring to deliver said metal ring to an unloading position, an unloaded ring placement unit disposed in said unloading position for placing said metal ring which is unloaded, and releasing means disposed in said unloaded ring placement unit for engaging the metal ring gripped by said unloaded ring gripping means and releasing the metal ring from said unloaded ring gripping means.

12. A metal ring loading and unloading apparatus according to claim 11, further comprising:

a rail extending from said loaded ring placement unit to said unloaded ring placement unit perpendicularly to respective axes of said support rollers, and moving means for moving along said rail, said loaded ring delivering means and said unloaded ring delivering means being integrally mounted on said moving means.

13. A metal ring loading and unloading apparatus according to claim 11, wherein said loaded ring gripping means has clamp means for gripping portions of at least said chords of said metal ring from inner and outer side surfaces thereof.

14. A metal ring loading and unloading apparatus according to claim 11, wherein said loaded ring placement unit has sheet width measuring means for measuring a sheet width of said metal ring on a flat surface when said metal ring is placed on said flat surface and radially pressed and deformed into said substantially elliptical shape by said pressing means.

15. A metal ring loading and unloading apparatus according to claim 11, wherein said unloaded ring placement unit has a guard wall for limiting, from outside, the metal ring which is resiliently expanded into a circular shape when released from said unloaded ring gripping means by said releasing means.

16. A metal ring loading and unloading apparatus according to claim 11, wherein said unloaded ring gripping means has clamp means for gripping portions of at least said chords of said metal ring from inner and outer side surfaces thereof.

17. A metal ring loading and unloading apparatus according to claim 11, wherein said apparatus comprises a circumferential length correcting machine for correcting said metal ring to have a predetermined circumferential length by supporting said metal ring on said support rollers and moving said one of the support rollers away from said other support roller with said support roller moving means thereby imparting a tension to said metal ring.

18. A metal ring loading and unloading apparatus according to claim 11, wherein said apparatus comprises a rolling mill for rolling said metal ring to have a predetermined circumferential length by supporting said metal ring on said support rollers and moving said one of the support rollers away from said other support roller with said support roller moving means thereby imparting a tension to said metal ring.

* * * * *